May 12, 1931. W. J. STEFFLER 1,805,318
LOG AND TREE SAW
Filed Nov. 7, 1929 5 Sheets-Sheet 1
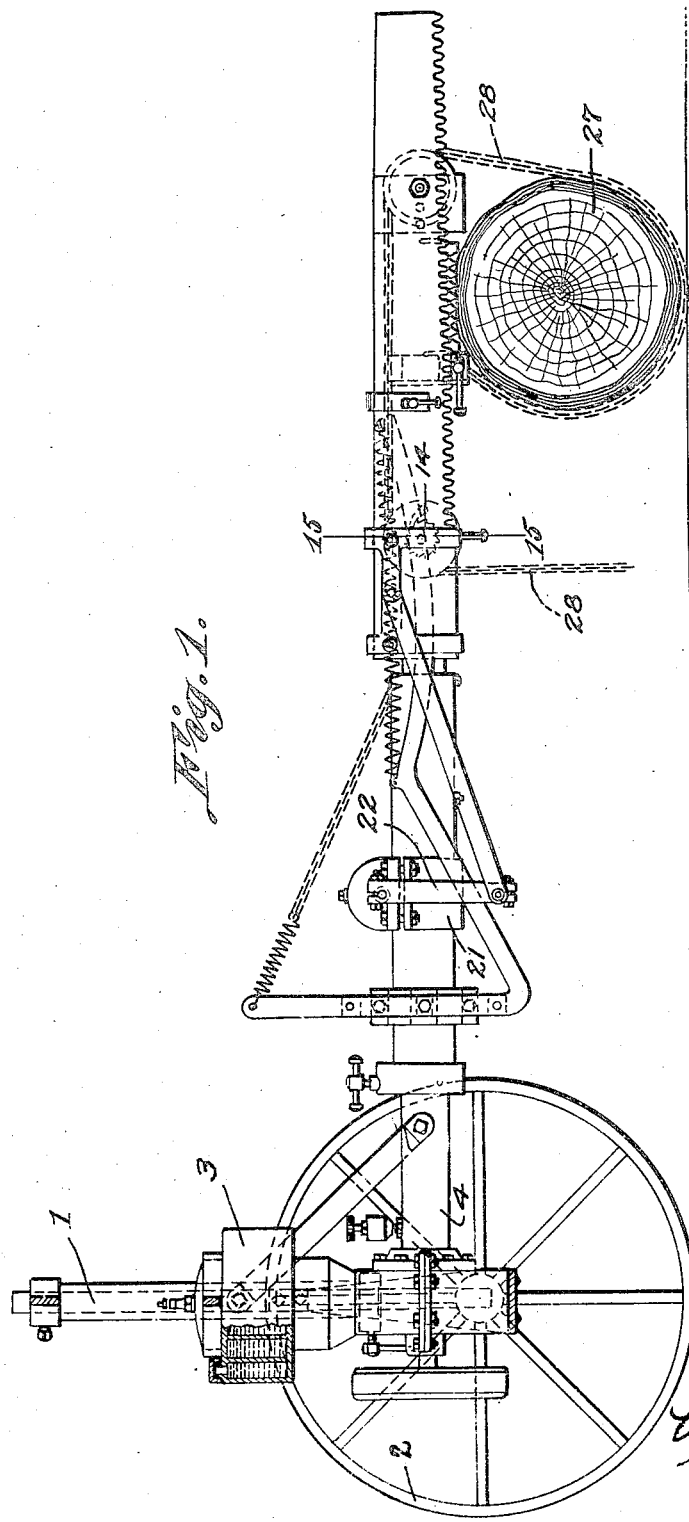
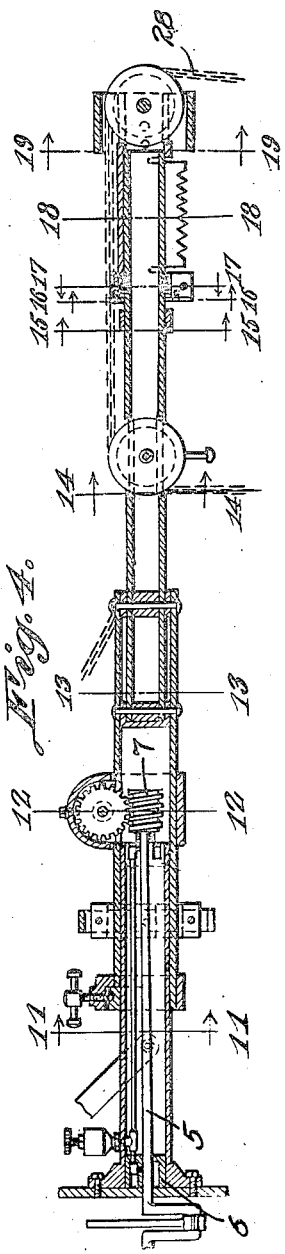
INVENTOR
William J. Steffler

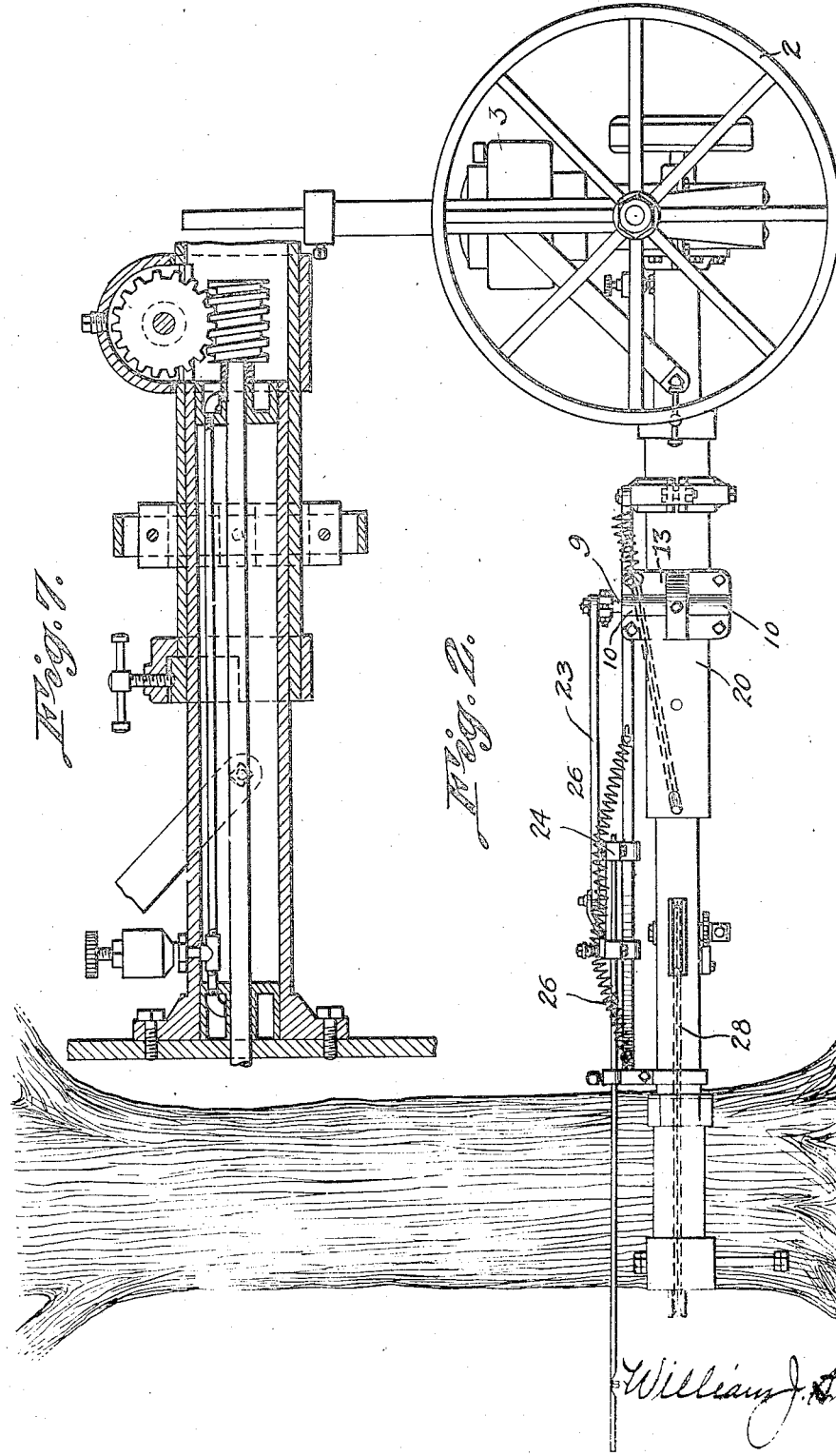

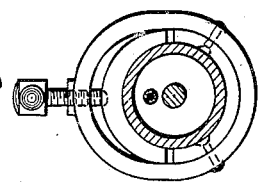
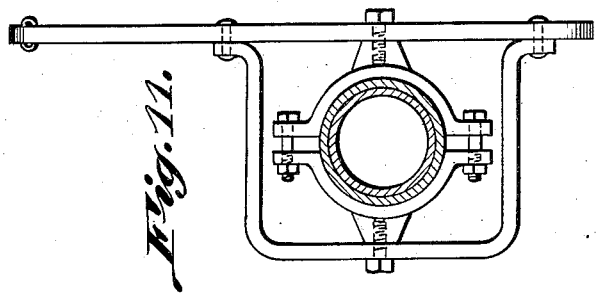
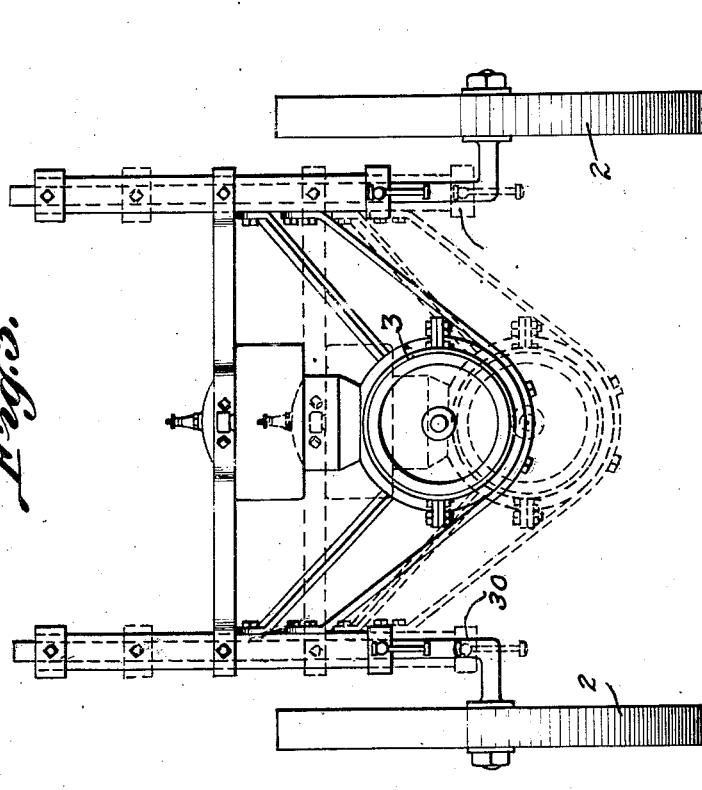

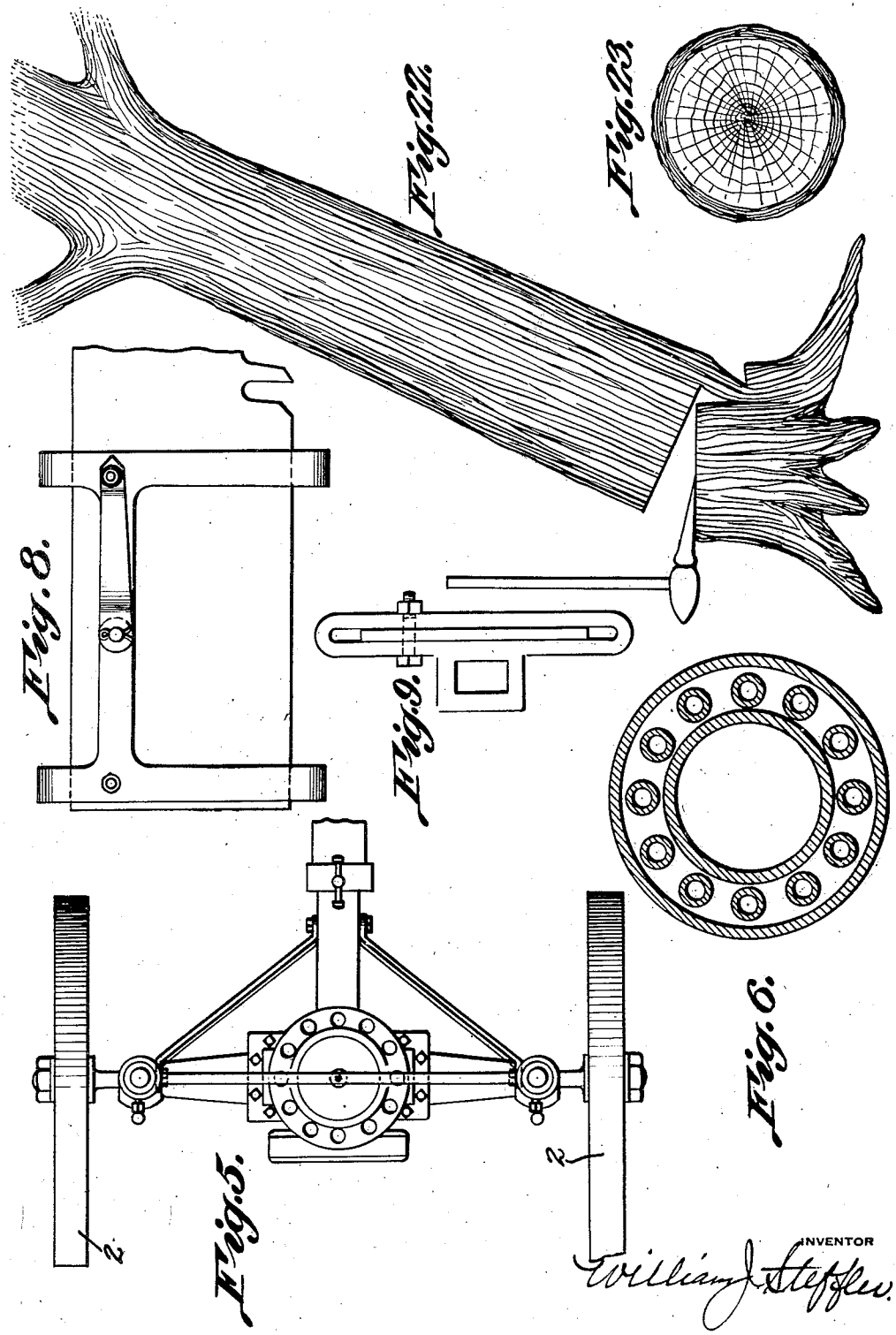

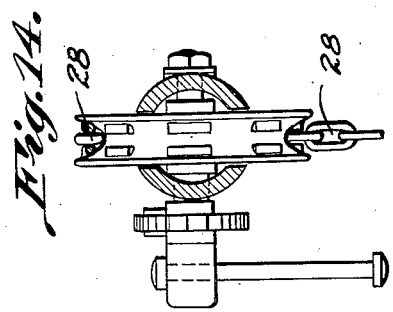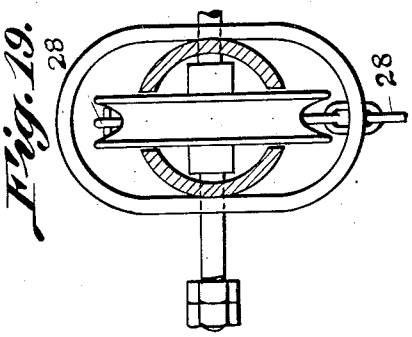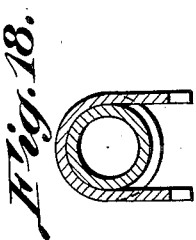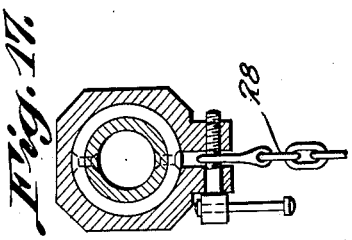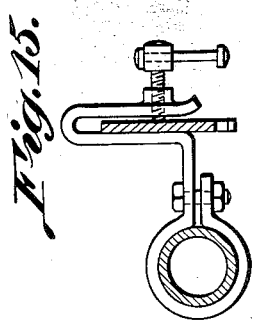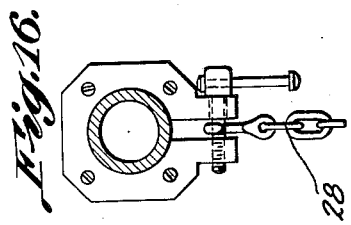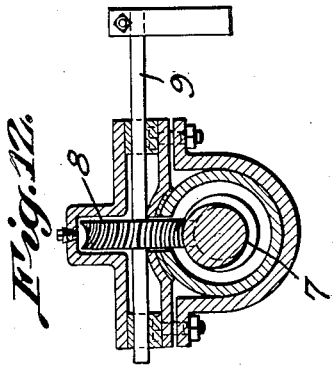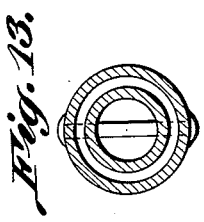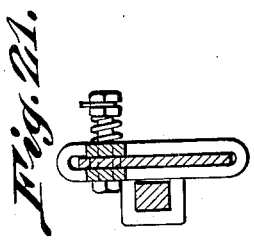

Patented May 12, 1931

1,805,318

UNITED STATES PATENT OFFICE

WILLIAM J. STEFFLER, OF ANDERSON, INDIANA

LOG AND TREE SAW

Application filed November 7, 1929. Serial No. 405,475.

The invention relates to improvements in log and tree saws in which a reciprocating drag saw is operated by a one cylinder internal combustion engine and a handy and convenient means by which the saw can be changed from vertical to horizontal or from a tree felling saw to a log or cordwood saw, by simply turning a piece of hollow steel tubing to which the sawing mechanism is attached.

The object of my invention is to provide a machine or tool that is easily portable and light enough in weight so that one man can easily handle it on almost any kind or condition of ground, and at the same time a machine that can be as readily adapted to felling large trees as it can be to cutting them into log lengths or cord-wood; furthermore, this saw can be set in an operative position on the tree by means of the hollow steel tubing and worm gear drive, so that the saw will cut into the tree at any angle in the circle, and therefore the V-shaped notch which is most generally cut into the tree with an ax, can be made with this saw. The object of cutting a notch in the tree on the same side or direction in which it is desirable to fall it is twofold, first, it has a tendency to weaken the tree on this side, causing it to fall in the desired direction, and second, it leaves a projection so as the tree in the act of falling cannot slide backwards on the stump and cause injury or damage. Figure 22 in the drawings illustrates this point.

On account of the ease and convenience with which the saw can be changed from one operative position to another, and also because the machine is readily portable and can be adjusted by means of the vertically sliding axles on the wheels which support the weight of the machine, so as to adapt it to sloping ground or hillsides; it would be something of a labor saving device for men in the lumbering or logging business, as well as to those who desire to cut logs into stove-wood lengths.

Figure 1 in the drawings is a side elevation of the invention as it would appear in an operative position on a log or down tree.

Figure 2, is also a side elevation, showing the invention in proper position for felling a tree.

Figure 3, is a rear view of the machine showing how it can be raised or lowered by means of the vertically sliding axles, so as to adapt it to sloping ground or any irregularity of the surface of a forest.

Each side can be raised or lowered independent of the other side, and secured in any position by means of the vise like clamps at the bottom of the hollow vertical uprights located at each side of the square frame.

Figure 4 is a view of the hollow steel tubing to which the sawing mechanism is attached, showing the manner in which the power is transmitted from the engine to the saw crankshaft. This tubing which is reduced in diameter at the end which comes in contact with the log or tree to be sawed, carries on this outer end a toothed piece of tubing, which telescopes onto it and which can be rotated so that the teeth on same will come into contact with the surface of the log or tree to be sawed, and by tightening the chain, the machine is held rigid to the log or tree, regardless of the angle at which said log or tree may be in relation to the machine. In Figure 4 is also shown the different parts, Figures 10—11—12—13—14—15—16—17—18—19 and their proper positions on the hollow tubing.

Figure 5 is a plan view of the rear end of the invention showing the motor and frame to which it is attached, also the wheels, brace rods and part of the hollow tubing to which the sawing mechanism is secured.

Figure 6 is a plan view in cross section of the tubular water jacket which surrounds the cylinder of the engine.

Figure 7 is that portion of the hollow tubing, which is attached to the engine crank case, showing the manner in which the driving shaft from the engine is housed within it; the worm gears which drive the saw-crankshaft, and how the largest or central piece of tubing, to which the sawing mechanism is secured, revolves upon the one in which the driving shaft is housed, allowing the saw to be turned to any angle, without the teeth in the gears becoming disengaged.

It also illustrates the vise handled clamp by means of which the saw is held in operative position, also the clamp-hinge to which the saw guide arm is pivoted and the lubricating system of the two housed-in bearings.

Figure 8 is a side elevation of the saw handle to which the pitman from the saw crank-shaft is attached.

Figure 9 is an end elevation of the saw handle, showing the slide bearing at each end of the handle.

Figure 10 is an end view of the vise-handled clamp which holds the saw in the proper operative position.

Figure 11 is an end elevation of the clamp-hinge, showing a portion of the saw guide arm and yoke pivoted thereto by means of two cap screws. This hinge or pivot is the means by which the saw drops or is allowed to proceed in the cut.

Figure 12 shows how the worm gear housing with the saw crank-shaft bearings attached thereto are made fast to the central piece of hollow tubing, this tubing having a slot cut in same to allow the large gear wheel to project through it and mesh properly with the worm, which is attached to the engine crank-shaft.

Figure 13 is an end view of the manner in which the small diameter tube is secured to the one of larger diameter. Figure 4 illustrates this more clearly.

Figure 14 gives an end view of the log chain sprocket wheel and ratchet used to tighten chain around log or tree.

Figure 15 is the saw guide which is clamped to the tubing; the screw with vise-handle is tightened on the saw when moving the machine from place to place, this holds the saw parallel to the tubing.

Figure 16 is a rear end view of the clamp which is used to hold the toothed section of tubing in its proper position with teeth against the log.

Figure 17 is the same clamp mentioned above before the end plate shown in Figure 16 has been attached.

Figure 18 shows how a section of the central portion of the toothed piece of tubing is bent downwards on each side so as to form the projections on which the teeth are cut.

Figure 19 is a plain cast iron sheave wheel over which the tightening chain passes, said wheel being enclosed on its backside by a housing. A sliding handle goes through this housing, tubing and the hub of the sheave wheel. This handle is used to push the machine from one place to another and is made sliding like a vise handle so as it can be pushed out of the way of knots or limbs on the tree or log.

Figure 20 indicates the position of a slot cut into the saw blades; a bolt passes through this slot and through the saw handle casting, said slot permits of a slight up and down motion at the rear end of the saw blade, caused by the curve in the saw guide arm.

Figure 21 is an end elevation of the saw handle casting nearest the log or tree, a stiff coil spring is slipped over the projecting end of the bolt that passes through the slot in saw blade, said spring compresses the sides of the handle upon the blade, which retards its abrupt rise and fall to some extent, causing a more silent operation.

Figure 22 represents the safest and most practical method of feeling a large tree, and shows the position of the notch that formerly was cut by hand with an ax, and which can be done with this saw.

Figure 23 is a plan view of the tree stump and illustrates how the saw should be made to cut faster, on the opposite side from the direction in which it is desirable to fall the tree. In preparing a more detailed description of the invention, and the operation of its several parts, I will begin with the frame 1 which is supported by the wheels 2—2, the motor 3 which is secured to the frame 1 and as shown in Figure 3 has a hollow tube extension 4 securely fastened to the center of its crank-case, through this tube extension 4 a shaft 5 is directly connected to the motor crank-shaft endwise and supported by bearings 6—6. To the outer end of shaft 5 a worm 7, Figure 12, is secured which meshes with a gear 8, Figure 12, which is located on saw crank-shaft 9, Figure 2, shaft 9 being held to its proper position by bearings 10—10, Figure 2. These bearings 10—10 constitute a part of a casting 13 which is rounded on its under side so as to fit snugly upon a revolvable tube 20 to which it is securely bolted by means of a saddle or yoke 21, this casting 13 also functions as a housing for the gear 8. On the end of the saw crank-shaft 9 in line with the saw, a crank arm 22 is placed, this crank arm imparts a reciprocating motion to the saw by means of a pitman 23 attached to the crank and saw handle casting 24 in the usual manner. The saw handle casting 24 is provided with sliding bearings (illustrated in Figure 9) said sliding bearings operate upon a curved guide arm 25. At each end of the curve on said guide arm is attached a pull tension coil spring 26—26 the other ends of these springs being secured to the saw handle casting 24. The purpose of these springs is to help start the saw at each end of its stroke, upon its return stroke, thereby relieving the saw crank of the sudden jerk at each end of the saw stroke which is caused by the sudden change of the saws direction of travel.

These springs 26—26 are important, as they tend to counter-balance the stroke of the saw, allowing it to be run at a higher speed. The saw guide arm 25 is made circular throughout the length of travel of the sliding bearings, so as to produce a rocking motion of the rear end of the saw, thereby causing the saw to keep the kerf or cut in the log more free of saw-dust which gives the saw faster cutting power. A saw guide Figure 15 is provided to guide the saw in starting a cut, this guide is clamped onto the tubular saw support, a shown at 15—15 Figure 4. A device made of tubing 18—18, Figure 4, cut half way through near each end, then split lengthwise, mid-way between the two ends of the cuts, and these cut portions upon being bent outwards at each side, forms two parallel projections upon which suitable teeth are cut with which to grip the surface of a log or tree, said teeth are forced into the log 27 by tightening the anchor-chain 28 by means of the sprocket wheel and ratchet 14, Figure 4. This holds the machine securely to the log or tree that is being sawed, preventing the machine from moving out of alignment with the saw. A clamp, Figures 16 and 17 of the drawings, is secured to the rear end of this toothed segment piece of tubing which can be tightened or locked to the tube upon which it revolves. However, this clamp is not an absolutely necessity. One end of the pull tension coil spring 29 is made fast to the vertically projecting end of the saw guide arm 25 the other end of said spring being made fast with a length of chain and said chain being fastened at a suitable place on the revolvable piece of tubing is the means whereby the saw is held in contact with the tree or log that is being sawed, and by hooking up said chain in the proper links, a greater or lesser tension can be exerted on the saw blade making it cut faster or slower as desired.

The wheels 2—2 which carry the weight of the machine, being fitted with pivot axles, besides being vertically adjustable to any desired height (within the limit of length of said axles) can be turned so they will stand at right angles to the machine and secured in that position by means of the vise-handled clamping members 30—30 said clamping members being similar in construction to members being similar in construction to Figure 10 of the drawings. In cutting logs into stove-wood lengths it is desirable to turn the wheels 2—2 to the right angle position and secure them, then by raising the saw clear of the log the machine can be easily pushed from cut to cut. By securing the motor 3 somewhat to the rear of its position shown in the drawings the machine can be balanced upon its axles to such an extent that very little weight will fall upon the operator at the handle in moving the machine from one place to another.

Also, by using a motor of light weight construction in connection with the hollow tubing employed in this machine, it can be produced of such a weight that a strong man can lift or carry it over such things as fallen logs, gulleys or other obstructions that would be impossible in a machine of heavy build.

I am fully aware of the fact that drag saws have been mounted on skids or parallel bars, supported by two wheels, prior to my invention, therefore I do not claim to be the original inventor of portable drag saws, what I claim is:

1. A saw comprising a frame, tubular sections carried by the frame, a motor mounted upon the frame, a saw guide carried by the sections, a blade slidable with relation to the guide, means operatively connecting the motor with the blade, a guide arm pivoted upon the sections and having an end portion overlapping the blade, springs connected at one end with the blade operating means, and at their other ends with the guide arm at points beyond the opposite sides of the end edge of the blade, and spring means tending to hold the overlapping portions of the blade and arm in a depressed position.

2. A saw comprising a frame, tubular sections mounted thereon, a motor mounted thereon, a guide carried by the sections, a blade slidable in said guide, means operatively connecting the motor with the blade, a guide arm having angularly disposed end portions, one end portion being pivoted to the tubular sections, a spring connected with said end portion and one of the tubular sections, the other end portion of said guide arm having a curved stretch, springs connected at their outer ends with the last mentioned end portion of said arm at the opposite ends of said curved stretch and connected at their inner ends with the means connecting the blade with the motor.

3. A saw comprising an upright frame, said frame carried by vertically adjustable wheels with pivot axles, a motor mounted thereto, aligned cylindrical and telescopic sections, rotatable with relation to each other and secured endwise to the vertical frame, intermeshing members journaled within and upon said sections, the outer member rotatably intermeshed circling the axis of the inner member, means operatively connecting one of said members with the motor, said member having its axis coincident or parallel to the axis of said sections, the other member having its axis at a right angle to the axis of the sections, a guide arm carried by said sections, a casing mounted upon one section, partly housing the intermeshing members, a saw blade slidable on the guide arm parallel to the sections, and operating means connecting the blade and the last mentioned member, and also a slotted saw steadying guide, a sliding transportation handle, a tubular toothed segment and chain anchoring means carried by said sections at their outer end.

WM. J. STEFFLER.